United States Patent
Li et al.

(10) Patent No.: US 9,544,710 B2
(45) Date of Patent: Jan. 10, 2017

(54) ONE METHOD OF DELEGATE-BASED GROUP CHANNEL ACCESS

(75) Inventors: Honggang Li, Beijing (CN); Rui Huang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 324 days.

(21) Appl. No.: 13/997,240

(22) PCT Filed: May 3, 2012

(86) PCT No.: PCT/US2012/036276
§ 371 (c)(1),
(2), (4) Date: Mar. 11, 2014

(87) PCT Pub. No.: WO2013/009380
PCT Pub. Date: Jan. 17, 2013

(65) Prior Publication Data
US 2015/0189458 A1 Jul. 2, 2015

Related U.S. Application Data

(60) Provisional application No. 61/507,030, filed on Jul. 12, 2011.

(51) Int. Cl.
*H04W 4/00* (2009.01)
*H04W 56/00* (2009.01)
(Continued)

(52) U.S. Cl.
CPC ............ *H04W 4/005* (2013.01); *H04L 5/0039* (2013.01); *H04L 67/12* (2013.01); *H04W 56/004* (2013.01);
(Continued)

(58) Field of Classification Search
CPC ........ H04W 74/00; H04W 4/00; H04W 76/00; H04W 4/005; H04W 56/004; H04W 72/0446; H04W 72/048; H04L 5/0039; H04L 67/12
See application file for complete search history.

(56) References Cited

U.S. PATENT DOCUMENTS

| | | | |
|---|---|---|---|
| 8,095,120 B1 * | 1/2012 | Blair .................... | H04M 3/562 379/202.01 |
| 2009/0082005 A1 * | 3/2009 | Thorson ................ | H04W 48/00 455/422.1 |

(Continued)

FOREIGN PATENT DOCUMENTS

WO 2013/009380 A1 1/2013

OTHER PUBLICATIONS

Zhou et. al., "Proposed Text for network access entry for a large number of M2M devices", Mar. 6, 2011, IEEE C 802.16p-11/0008, pp. 1-6.*

(Continued)

*Primary Examiner* — Andrew Lai
*Assistant Examiner* — Sumitra Ganguly
(74) *Attorney, Agent, or Firm* — Carrie A Boone PC

(57) ABSTRACT

A delegate-based group channel access method is disclosed for machine-to-machine (M2M) communication. The delegate-based group channel access method groups M2M devices having common characteristics together, assigns a single delegate or multiple delegates from the group according to some criteria, and uses the assigned delegate to perform channel access. This method avoids unnecessary peer-to-peer communication between M2M devices, reduces the probability of collision on the channel during initial channel access, and reduces the control signaling overhead. The, delegate-based group channel access method also coordinates the number of slots to backoff so that all M2M devices in the group keep pace with the delegate.

3 Claims, 7 Drawing Sheets

(51) Int. Cl.
*H04W 72/04* (2009.01)
*H04L 5/00* (2006.01)
*H04L 29/08* (2006.01)

(52) U.S. Cl.
CPC ....... *H04W 72/048* (2013.01); *H04W 72/0446* (2013.01)

(56) References Cited

U.S. PATENT DOCUMENTS

| | | | | |
|---|---|---|---|---|
| 2011/0128911 | A1* | 6/2011 | Shaheen | H04L 63/104 370/328 |
| 2011/0194511 | A1* | 8/2011 | Chen | H04W 72/121 370/329 |
| 2012/0093098 | A1* | 4/2012 | Charbit | H04W 72/04 370/329 |
| 2012/0142268 | A1* | 6/2012 | Tao | H04W 4/08 455/3.05 |
| 2013/0208708 | A1* | 8/2013 | Nezou | H04W 72/0446 370/336 |

OTHER PUBLICATIONS

Zhou et. al., "Proposed Text for network access entry for a large number of M2M devices", Mar. 6, 2011, IEEE C802.16p-11/0008, pp. 1-6.*

Zhou et. al., "Proposed Text for network access entry for a large number of M2M devices", May 19, 2011, IEEE C802.16p-11/00059r2, pp. 1-4.*

Zhou et. al., "Proposed Text for network access entry for a large number of M2M devices", Mar. 6, 2011, IEEE C802.16p-11/0008r1, pp. 1-2.*

First Office Action dated Oct. 26, 2015 received from State Intellectual Property Office, P.R. China for CN Patent Application No. 201280034430.4 (14 pages).

"Proposed Text for network access entry for a large number of M2M devices", Lei Zhou, Hai Wang, Xufeng Zheng, IEEE C802.16P-11/000811, Sections 1 and 3.

Office Action for German Patent Application No. 11 2012 002 917.8, mailed on Apr. 17, 2015, 5 pages.

Lei Zhou, et al., "Proposed Text for network access entry for a large number of M2M devices," IEEE 802.16 Broadband Wireless Access Working Group, Mar. 6, 2011, IEEE C802.16p-11/0008, 44 pages.

Office Action for Korean Patent Application No. 2014-7002324, mailed on Apr. 30, 2015, 6 pages.

Lei Zhou, et al., "Proposed Text for network access entry for a large number of M2M devices," IEEE 802.16 Broadband Wireless Access Working Group, Mar. 6, 2011, IEEE C802.16p-11/0008r1, 2 pages.

International Preliminary Report on Patentability with Written Opinion received for PCT Patent Application No. PCT/US2012/036276, mailed on Jan. 23, 2014, 7 Pages.

Lei, et al., "Proposed Text for network access entry for a large number of M2M devices", IEEE 802.16 Broadband Wireless Access Working Group, IEEE C802, Mar. 6, 2011,16p-11/0008r1, 2 pages.

Park, et al., "Proposed text for network reentry procedure of fixed M2M device", IEEE 802. 16 Broadband Wireless Access Working Group, IEEEC802, Mar. 6, 2011,16p-11/0018, 7 pages.

Li et al., "Group-based M2M solutions", IEEE 802.16 Broadband Wireless Access Working Group, IEEEC802, Mar. 3, 2011,16p-11/0013, 12 pages.

International Search Report and Written Opinion Received for PCT Patent Application No. PCT/US2012/036276, mailed on Nov. 28, 2012, 10 pages.

Second Office Action received for Chinese Patent Application No. 201280034430.4, mailed on Jun. 21, 2016, 14 pages.

"Proposed text for network access entry for a large number of M2M devices", Lei Zhou, Hai Wang, Xufeng Zheng, IEEE C802.16P-11/0059r2, sections 1 and 3, Mar. 17, 2011, May 19, 2011.

* cited by examiner

ONE METHOD OF DELEGATE-BASED GROUP CHANNEL ACCESS

CROSS-REFERENCE TO RELATED APPLICATIONS

This application is a continuation of United States Patent Cooperation Treaty Application No. PCT/US2012/036276, filed on May 3, 2012, and is also a continuation of U.S. Provisional Patent Application No. 61/507,030, filed at the United States Patent and Trademark Office on Jul. 12, 2011.

TECHNICAL FIELD

This application relates to machine-to-machine communication in some advanced wireless systems, such as those implementing the IEEE 802.16 and 3GPP standards.

BACKGROUND

Machine-to-machine communication is a very distinct capability that enables the implementation of the "Internet of things". Machine-to-machine communication is defined as an information exchange between a subscriber station and a server station in a core network (through a base station) or between subscriber stations, which may be carried out without any human interaction. Its basic architecture is proposed in IEEE 802.16m. (IEEE is short for the Institute of Electrical and Electronics Engineers.)

Several industry reports have scoped out the huge potential for this market, with millions of devices being connected over the next five years and revenues in excess of $300 billion (Harbor Research, 2009). So, machine-to-machine technology is a hot research item in some dominated wireless standard research groups, i.e., 3GPP and 802.16.

According to one IEEE 802.16p system requirement, a machine-to-machine system shall support a large number of devices and mechanisms for low power consumption in machine-to-machine devices. Therefore, there are expected to be a large, number of machine-to-machine devices in the domain of the machine-to-machine base station. The machine-to-machine support thus is expected to require a huge amount of interactions between the machine-to-machine devices and their supporting base station. For instance, where the base station needs to communicate with the separated machine-to-machine devices, one, by one, this would result in some network congestion.

In machine-to-machine (M2M) communication, there will be a large number of devices trying to access the channel. Thus, there is a need for a more efficient channel access mechanism to cope with this issue.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a delegate-based group channel access method is disclosed for machine-to-machine (M2M) communication. The delegate-based group channel access method includes a delegate-based channel access and allocation portion, which groups M2M devices having common characteristics together, assigns a single delegate or multiple delegates from the group according to some criteria, and uses the assigned delegate to perform channel access. This method avoids unnecessary peer-to-peer communication between M2M devices, reduces the probability of collision on the channel during initial channel access, and reduces the control signaling overhead. The delegate-based group channel access method also includes a group-based backoff and random access portion, which coordinates the number of slots to backoff so that all M2M devices in the group keep pace with the delegate.

Figure 1:
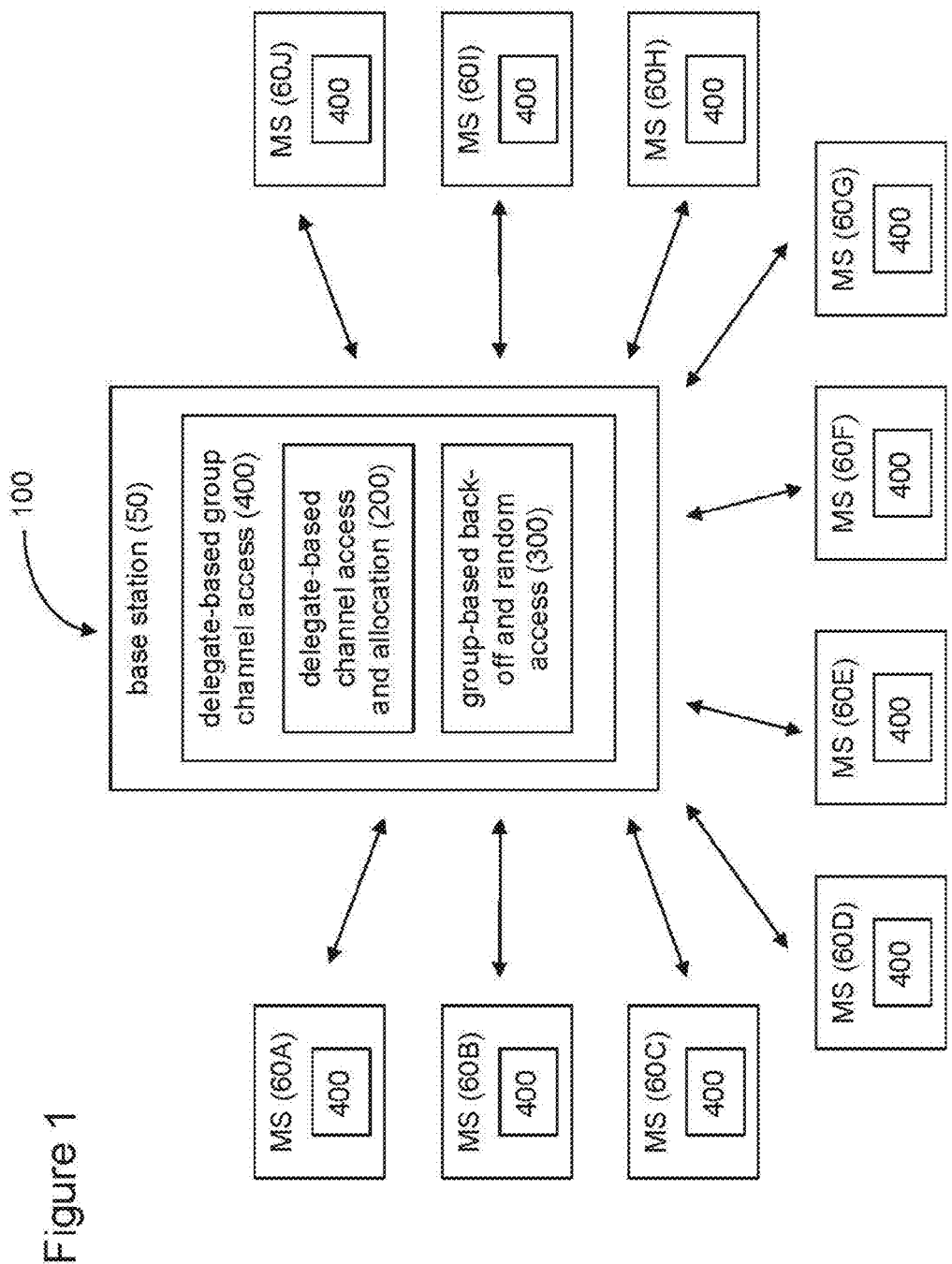
FIG. 1 is a simplified block diagram of a wireless network supporting a delegate-based group channel access method, according to some embodiments.

FIG. 1 is a simplified block diagram of a cellular neighborhood 100 containing a base station (BS) 50 and one or more mobile stations (MSs) 60A, 60B, . . . , 60J (collectively, MSs 60), according to some embodiments. The MSs 60 are also known herein as machine-to-machine (M2M) devices. As used herein, the BS 50 and the MSs 60 are defined as entities having capability under the IEEE 802.16m specification.

A delegate-based group channel access method 400 is shown in the BS 50 as well as in the MSs 60, which includes two parts, a delegate-based channel access and allocation portion 200 and a group-based backoff and random access portion 300. The delegate-based group channel access method 400 assigns one or more of the MSs 60 as the "delegate" of the group. Then, the delegate MS accesses the channel on behalf of the group, although all members 60 of the group nevertheless are able, to listen to the BS 50. If the BS 50 responds with an acknowledgment and channel allocation to the group, the group members are able to access the channel. The channel access may be with our without contention between group members. In this manner, peer-to-peer communication between group members 60 is avoided, the probability of collision is avoided, and there is reduced control signaling overhead.

To support the random access of a large number of M2M devices, the delegate-based group channel access method 400 groups the MSs 60 based some common characteristic held by each MS in the cellular neighborhood 100. Examples of common characteristics include, but are not limited to, similarity of geo-location, traffic characteristics, functionality, and ownership. Once the MSs 60 are grouped together, the delegate-based group channel access 400 is used, in some embodiments, to reduce the probability of collision. By assigning a delegate to each group, peer-to-peer communication among members of the group is avoided, since the group members share the common characteristic and may thus share access to the channel. Additional benefits include reduction in collision probability and a reduced control signaling overhead.

Delegate-Based Channel Access and Allocation (200)

Figure 2:
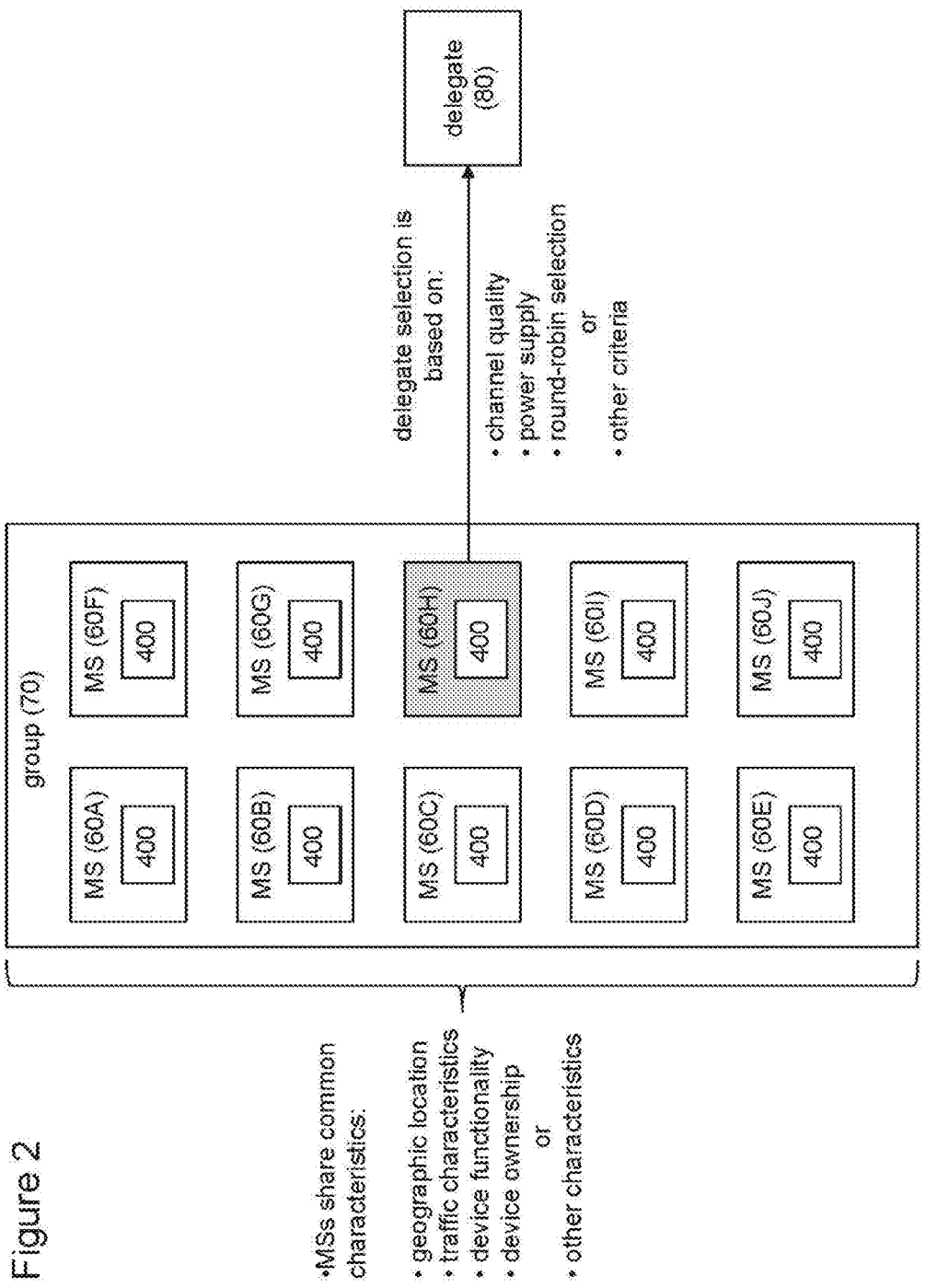
FIG. 2 is a simplified block diagram showing both grouping of M2M devices and the selection of a delegate from within the group, as performed by the delegate-based group channel access method of FIG. 1, according to some embodiments.

FIG. 2 is a simplified block diagram showing how the delegate-based group channel access method 408 both allocates M2M devices into groups and selects a representative delegate for the group. As described above the method 400 groups MSs 60 having common characteristics. Thus, for example, several M2M devices that are physically in proximity to one another (geographic location) may be grouped together. M2M devices that share traffic characteristics may form a distinct group. M2M devices having substantially similar functionality may likewise be grouped together. M2M devices that are commonly owned may share a group. Other characteristics not herein described may similarly prompt the delegate-based group channel access method 400 to group several M2M devices together. In FIG. 2, the ten MSs 60A-60J share a common characteristic and thus are deemed to form a group 70.

Once the group 70 has been designated, a delegate 80 is to be selected from the M2M devices contained therein. (Multiple delegates may also be assigned.) The delegate-based group channel access method 400 selects the delegate 80 based on one, or more, criteria about the group members. For example, the delegate 80 may be selected due to its superior channel quality, relative to other M2M devices in the group 70. Or, one of the M2M devices in the group 70 may have a power supply, while others do not, making it a preferred candidate to be selected as the delegate 80. Were the M2M devices in the group are substantially alike in their characteristics, in some embodiments, the delegate-based group channel access method 400 simply selects one M2M device from the group 70 at random. Succeeding selections of a delegate from the group are then made in a round-robin fashion so that each MS 60 will, at some point, be designated as the delegate. Other criteria not described explicitly herein may serve as the criterion for delegate selection. In FIG. 2, the MS 60H is selected as the delegate 80 to represent the group 70.

In some embodiments, the grouping of the M2M devices 60 and the assignment of the delegate or delegates 80 are performed by the base station 50, with the M2M mobile stations remaining passive devices. In other embodiments, the M2M mobile stations themselves form the group and assign the delegate, as active devices, with the base station 50 assigning the MGID and performing other group-based resource allocation. In still other embodiments, an upper layer network entity performs the grouping and delegate assignment, of the M2M devices 60.

Figure 3:
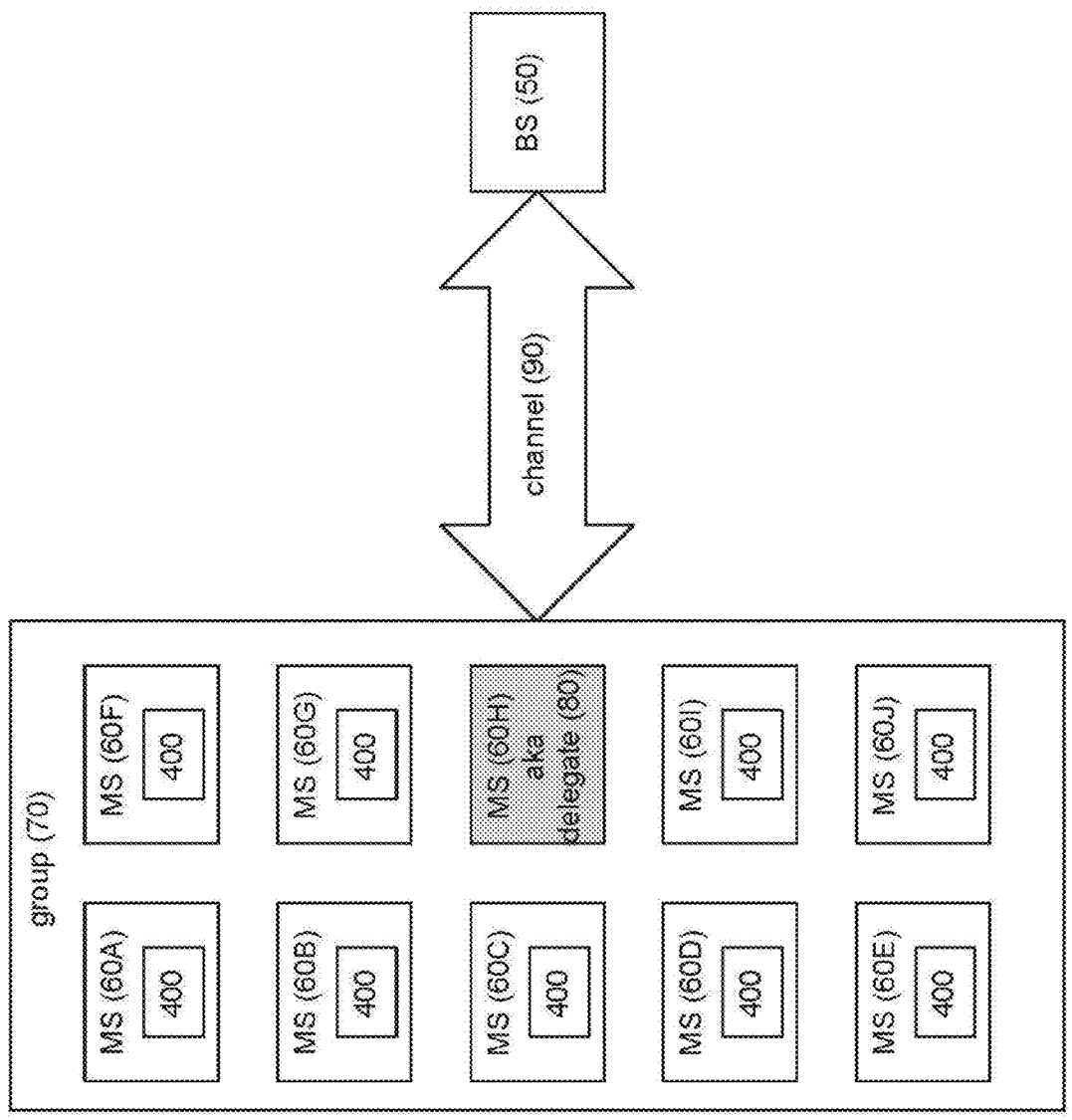
FIG. 3 is a simplified block diagram showing the wireless channel between the group and the base station, where the channel is to be accessed by the delegate-based group channel access method of FIG. 1, according to some embodiments.

Now that the MSs 60 have been designated to the group 70 and the delegate 80 from the M2M devices has been selected, the delegate will be able to communicate with the BS 50 over the wireless channel on behalf of all M2M devices within the group. FIG. 3 is a simplified block diagram showing the wireless channel 90 between the group 70 and the BS 50. The characteristics of the channel 90 may vary according to a number of different criteria not pertinent here.

Figure 4:
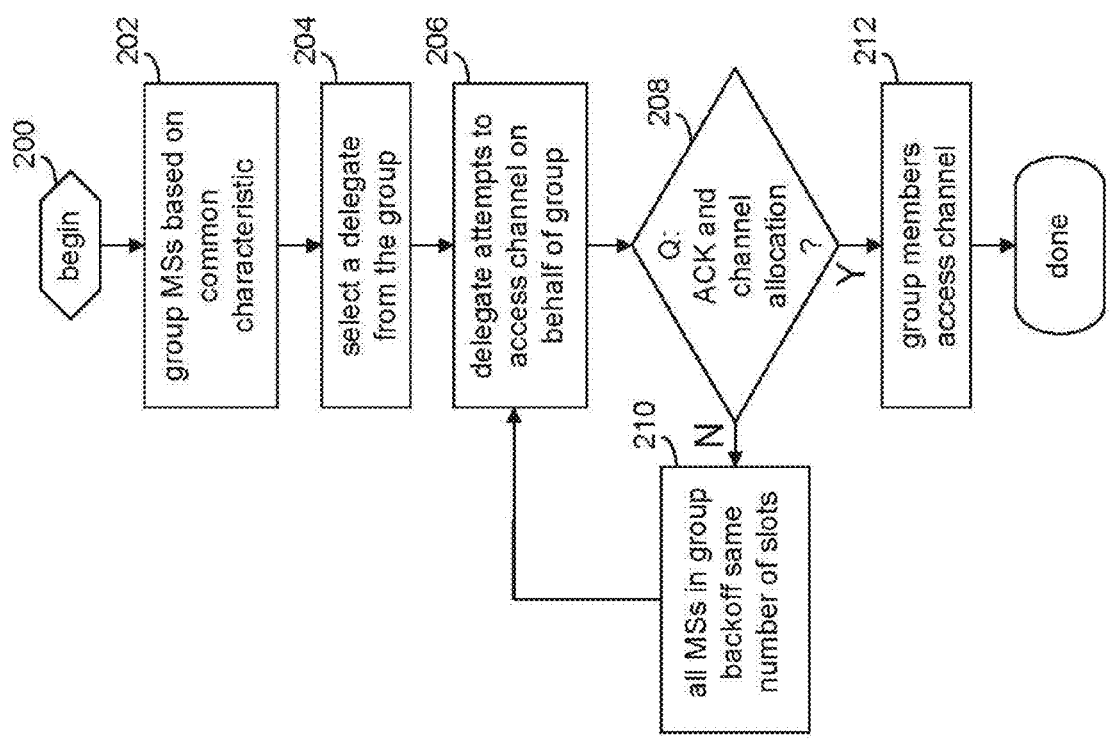
FIG. 4 is a flow diagram showing operations performed by the two-step delegate-based channel access and allocation portion of the delegate-based group channel access method of FIG. 1, according to some embodiments.

FIG. 4 is a flow showing operations performed by the delegate-based channel access and allocation portion 200 of the delegate-based group channel access method 400, according to some embodiments. After grouping the M2M MSs 60, based on some common characteristic between them (block 202), the delegate 80 is selected from the group 70 (block 204), as described above, The delegate 80, as representative of all BSs 50 within the group 70, attempts to access the wireless channel 90 that is disposed between the group 70 and the BS 50 (block 206).

At this stage, the delegate 80 tries to access the wireless channel 90 on behalf of the group 70. The access may be for entering the wireless network 100 for the first time, for network re-entry, or to request a bandwidth designation. some embodiments, the delegate 80 tries to access the channel 90 using a group identifier, known herein as the M2M group identifier (MGID). While the BS 50 responds to the single entity that makes the request (e.g., the delegate 80), all M2M devices are able to listen for the response.

If the BS 50 responds with an acknowledgement (ACK) and/or a channel allocation to the group 70 (the "yes" prong of block 208), the M2M devices within the group 70 are thereafter able to access the channel 90 (block 212). In some cases, the ACK is sent separately from the channel allocation, as the ranging response carries only the adjustment of the uplink synchronization and the transmit power. If, on the other hand, the ACK and channel allocation are not received from the BS 50 (the "no" prong of block 208), each MS 60 in the group 70 performs a backoff of the same number of slots (block 210), such that a new attempt at channel access may be performed at a later time. The backoff procedure is discussed further in the group-based backoff and random access 300 section, below.

Figure 5:
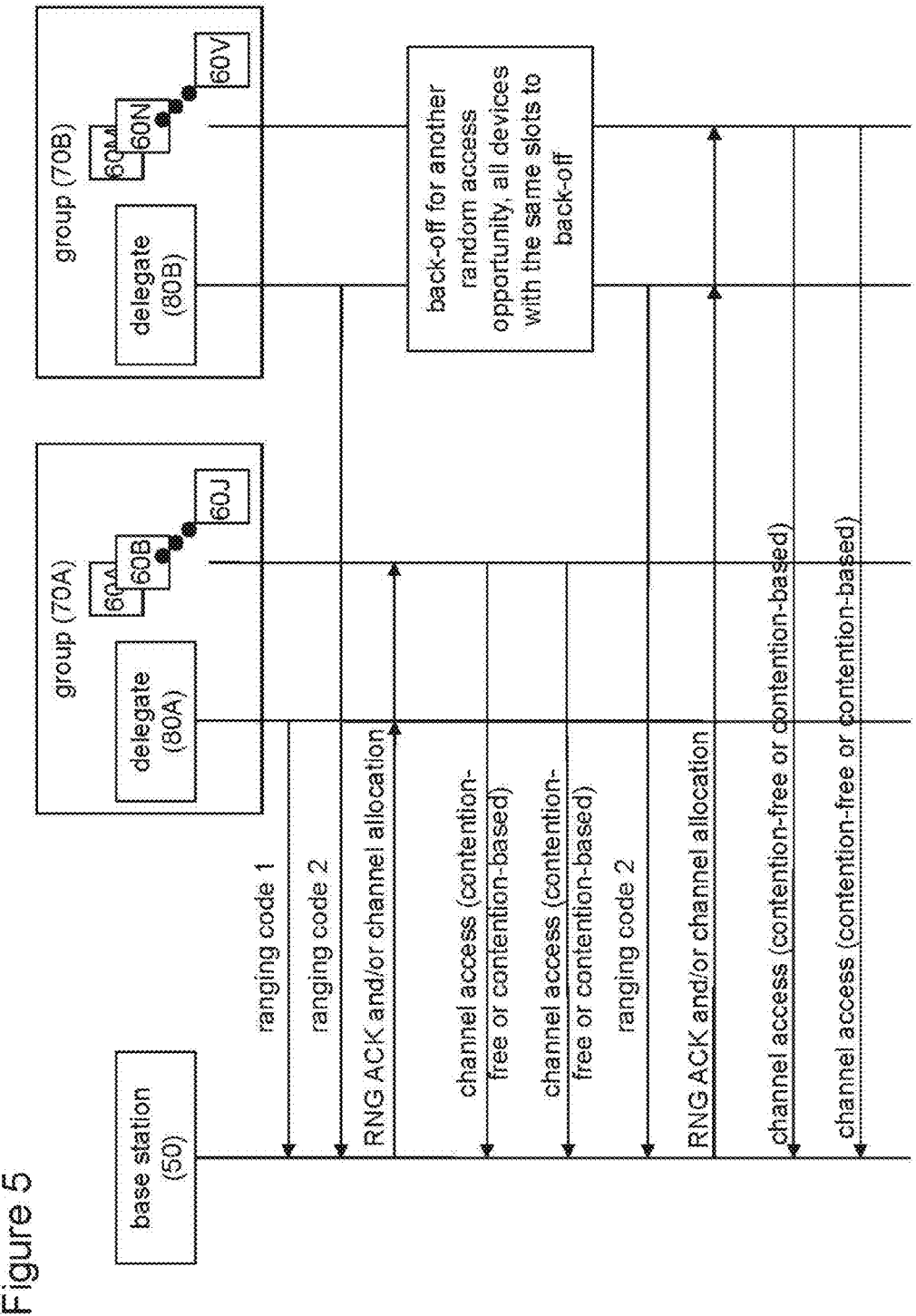
FIG. 5 is a timing diagram showing two different groups trying to access the wireless channel as performed by the delegate-based group channel access method of FIG. 1, according to some embodiments.

FIG. 5 is a diagram showing operations being performed between two groups 70A and 708 trying to access the channel 90 to the advanced base station 50, according to some embodiments. The group 70A consists of MSs 60A-60J, plus a delegate BOA, which was previously selected. The group 70B consists of MSs 60M-60V, plus a delegate 808. Each group 70A, 70B is vying for control of the wireless channel 90 between the M2M devices and the BS 50.

The, delegate 80A, on behalf of the group 70A, sends a first ranging code (ranging code 1) to the BS 50. Shortly thereafter, the delegate 80B, on behalf of the group 708, sends a second ranging code (ranging code 2) to the BS 50. The BS 50 sends a ranging acknowledgement (ACK) and/or a channel allocation to the delegate 80A, which is also heard by the M2M devices 60A-60J. During this channel access period, the M2M devices within the group 70A are able to access the channel 90. The access may be contention-free or contention-based. Nevertheless, the channel 90 is available to all MSs 60, including the delegate MS 80A, during this time.

Because the ranging ACK and channel allocation is given to the first group 70A at this time, the request by the second group 708 is, in essence, denied. Thus, the delegate 80B and the MSs 60M-60V perform backoff, with each doing backoff with the same number of slots as the delegate 80B such that they may access the channel 90 later. This procedure is described more fully in the group-based backoff and random access 300 section, below.

At a later time, the delegate 80B again sends the ranging code (ranging code 2) to the BS 50, which, in effect, requests access to the channel 90. This time, the BS 50 sends a ranging ACK to the delegate BOB, which the M2M devices 60M-60V are able to hear. Thereafter, all M2M devices within the group 701, the MSs 60M-60V and the delegate MS 808 are able to access the channel 90, whether in a contention-free or contention-based manner.

Group-Based Backoff and Random Access (300)

Because all group members can synchronize to the base station and get the acknowledgement from the base station, there is no need for peer-to-peer communication among the group members. This enables the delegate-based group channel access method 400 to be integrated into current wireless wide-area network (WWAN) systems, such as WiMAX or 3GPP (WiMAX is short for Worldwide Interoperability for Microwave Access; 3GPP is short for $3^{rd}$ Generation Partnership Project).

Where a single mobile station desires access to the base station via the, wireless channel, the mobile station uses the random access channel (RACH). The RACH is a shared channel used by devices to access the wireless network. Since the messages to the RACH are not scheduled, there, could be conflicts between the mobile station and other devices trying to access the network by way of the base station.

The mobile station sends a COMA (code division multiple access) ranging code to the base station. If no acknowledgement is received from the base station, otherwise known as the ranging response, or RNG-RSP, this means that the mobile station will not get access to the channel. Most likely, the failure to receive the acknowledgement occurred because of a collision with another mobile station also trying to obtain access to the base station.

Under COMA, time is divided into "slots". A slot is time period based on the total time it takes a symbol to be transmitted from one end of the wireless network to the other end and back. To conserve power, the mobile station only "wakes up" and listens for messages during its assigned slots. Otherwise, the mobile station is idle. So, to save its battery life, the mobile station sends the COMA ranging code during its assigned slots.

When the acknowledgement is not received, the mobile station will generate a random number, N, which is within some maximum value (known herein as the backoff_window), and, based on this number, will back off that number, N, of time slots and go back into idle mode, After the N slots have transpired, the mobile station again sends a COMA code to the base station to request access to the wireless channel.

For machine-to-machine transmissions, in some embodiments, the slot assignments need to be coordinated between group, members. For the group of M2M devices, if no acknowledgement is received by the group members, the M2M devices should be able to generate a single random number of slots when backoff takes place, which then enables the group members to listen to the future ACK from the base station to the delegate at the right time slot. Otherwise, the delegate-based mechanism cannot work. This is known as "synchronized backoff".

In some embodiments, synchronized backoff is performed by the group-based backoff and random access 300 portion of the delegate-based group channel access method 100. To keep the M2M group members (the MSs 60) synchronized, when backoff is to take place, the group members 60 need to backoff in a same number of slots so that they can keep pace with the delegate 80. Recall that backoff occurs when the group members do not receive the acknowledgement from the BS 50 or when the BS otherwise notifies them to backoff for another random access opportunity at a later time.

When backoff is required, in some embodiments, one M2M member of the group 70 uses a backoff slot index generator to determine the number of slots to be used during backoff. The group member may be any of the MSs 60 in the group (not required to be the delegate 80). In some embodiments, each M2M member 60 of the group 70 generates the same pseudo-random backoff slot index. This ensures that all group members 60 are able to wake up and act at the same moment to listen to the message exchange between the BS 50 and the delegate 80 at a later time.

In some embodiments, the following formula is used to generate the backoff slot index:

$$\text{Backoff\_Slot\_Index} = f(\text{MGID}, \text{Backoff\_Window}, \text{Initial\_Offset}) \quad (1)$$

In some embodiments, the formula f( . . . ) is a pseudo-random number generator, MGID is the M2M group identifier, Backoff_Window is the maximum number of backoff slots or the range of the backoff (which is related to the number of random access retries), and Initial_Offset is some initial value for the random number generator, which may be related or not related to the MGID, that is, the, initial seed related to the base station identifier.

The backoff slot index, Backoff_Slot_Index will be the same if a different M2M device in the group 70 generates it. Nevertheless, the backoff slot index seems random to other groups or to other M2M devices not within the group 70, so that the random access can be achieved.

Figure 6:
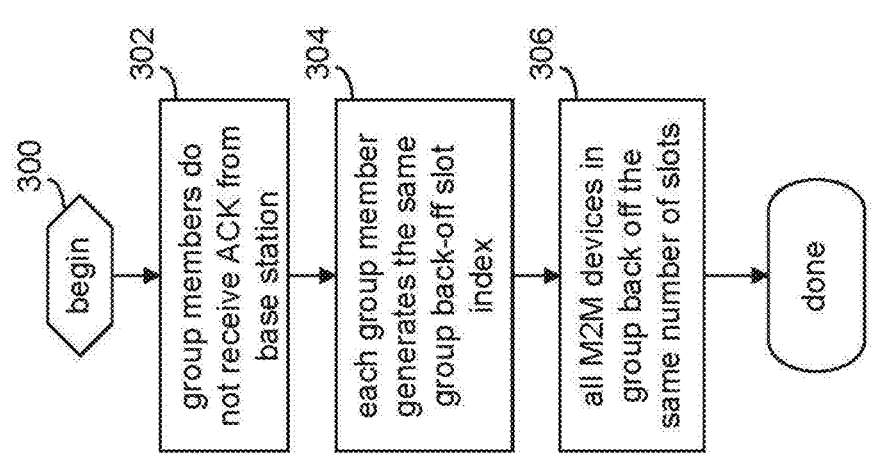
FIG. 6 is a flow diagram showing operations performed by the group-based backoff and random access portion of the delegate-based group channel access method of FIG. 1, according to some embodiments.

FIG. 6 is a flow diagram showing operations performed by the group-based backoff and random access portion 300 of the delegate-based group channel access method 400, according to some embodiments. At an initial stage, the M2M devices 60 of the group 70, including the delegate 80, do not receive the ACK and channel avocation from the BS 50 (block 302). This necessitates the generation of a backoff slot index by each of the group member 60 (block 304). In some embodiments, formula (1), above, is used to generate the backoff slot index. Once the backoff slot index is generated, all M2M devices 60 within the group 70 back off the same number of slots, as given by the index (block 306). This ensures that the MSs 60 are able to keep pace with the delegate 80 so that subsequent accesses to the channel 90 may be successful.

The prior art delegate-based solution to M2M devices relies on peer-to-peer communication among group members, which increases signaling overhead and the possibility of collision on the wireless channel. Other prior art solutions fix the number of backoff slots so that the non-delegate MSs can keep pace with the delegate. The delegate-based group channel access method 400 is preferred over a fixed backoff solution as there is better random access performance, in some embodiments.

The specific components/features of the delegate-based group channel access method 400 are straightforward. The delegate-based group channel access method 400 may be implemented in hardware, in software, or using a combination of hardware and software elements. In some embodiments, the delegate-based group channel access method 400 is implemented in software.

Figure 7:
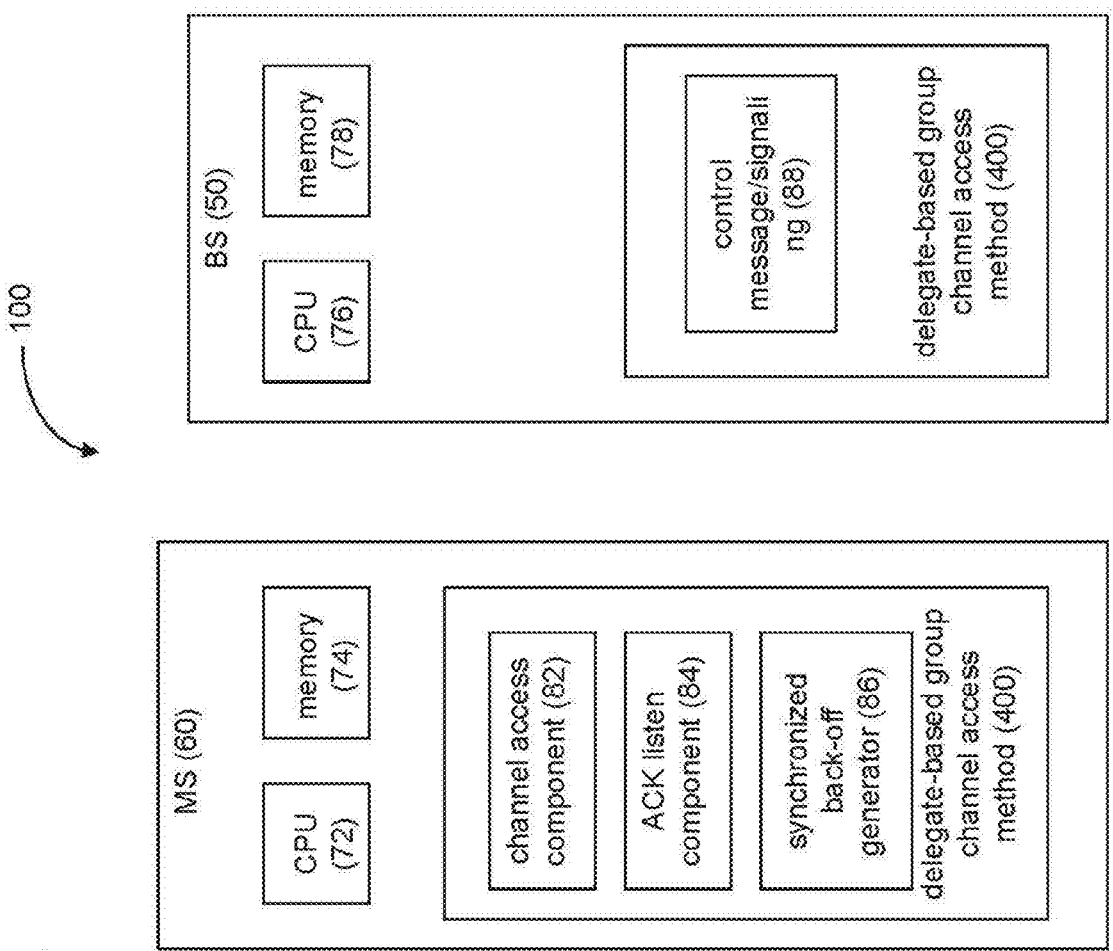
FIG. 7 is a simplified block diagram showing the components of the delegate-based group channel access method of FIG. 1 for the advanced base station and advanced mobile station, according to some embodiments.

FIG. 7 is a simplified block diagram showing the mobile station 60 and the base station 50 as part of the wireless network 100, according to some embodiments. Each of the mobile stations 60 has a central processing unit (CPU) 72 and a memory 74; similarly, the base station 50 has a CPU 76 and a memory 78. At the M2M device 60, there is a component responsible for delegate operations of first channel access (channel access component 82), a component for listening for the acknowledgement (ACK listening component 84), and a component for the synchronized backoff generator (synchronized backoff generator 86). At the base station 50, the method 400 includes is control message/signaling (control message/signaling 88) for performing the delegate-based channel access and channel allocation 200. The components of the delegate-based group channel access method 400, for the MS 60 and the BS 50 are depicted in the simplified diagram of FIG. 7, according to some embodiments.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A method to perform machine-to-machine (M2M) communication in a wireless network, the method comprising:

transmitting, by a delegate M2M mobile station in the wireless network, a ranging code to a base station in the wireless network, wherein the delegate M2M mobile station transmits on behalf of a group of one or more M2M mobile stations, wherein the one or more M2M mobile stations in the group share a common characteristic;

not receiving, by the delegate M2M mobile station, a ranging acknowledgement from the base station;

generating, by one of the one or more M2M mobile stations in the group, a group backoff slot index to be used by each of the one or more M2M mobile stations in the group, wherein the group backoff slot index is derived from a pseudo-random number generator and an identifier of the group, wherein the group backoff slot index is further derived using the following formula:

$$\text{Backoff\_Slot\_Index} = f(\text{MGID, Backoff\_Window, Initial\_Offset})$$

wherein MGID is the identifier, Backoff_Window is a maximum number of backoff slots in a range, wherein the range is related to a number of random access retries allowed for a wireless channel, and Initial_Offset is an initial value for the pseudo-random number generator; and performing, by each of the one or more M2M mobile stations in the group, a backoff operation of a number of slots, wherein the number is based on the group backoff slot index.

2. The method of claim 1, wherein the one M2M mobile station is the delegate M2M mobile station.

3. The method of claim 1, wherein the one M2M mobile station is not the delegate M2M mobile station.

* * * * *